(12) United States Patent
Yoo

(10) Patent No.: US 8,294,961 B2
(45) Date of Patent: Oct. 23, 2012

(54) SCANNING APPARATUS WITH POSITION INDICATOR AND IMAGE FORMING APPARATUS HAVING THE SAME

(75) Inventor: Yong-jun Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1188 days.

(21) Appl. No.: 11/684,170

(22) Filed: Mar. 9, 2007

(65) Prior Publication Data

US 2008/0062474 A1    Mar. 13, 2008

(30) Foreign Application Priority Data

Sep. 12, 2006 (KR) .......................... 10-2006-0088163

(51) Int. Cl.
*H04N 1/04* (2006.01)

(52) U.S. Cl. ....................................... 358/497; 358/474

(58) Field of Classification Search ................... 399/206, 399/211, 220; 355/20, 37, 70; 358/1.15, 358/402, 474, 494, 508; 379/88.21; 340/641; 455/420
See application file for complete search history.

(56) References Cited

U.S. PATENT DOCUMENTS

| 4,504,910 | A | * | 3/1985 | Araki et al. | 340/995.26 |
|---|---|---|---|---|---|
| 5,883,728 | A | * | 3/1999 | Kow | 358/494 |
| 5,900,950 | A | * | 5/1999 | Hsu | 358/474 |
| 2003/0128821 | A1 | * | 7/2003 | Luneau et al. | 379/88.21 |
| 2004/0027601 | A1 | * | 2/2004 | Ito et al. | 358/1.15 |
| 2005/0068188 | A1 | * | 3/2005 | Levin et al. | 340/641 |
| 2005/0196209 | A1 | * | 9/2005 | Lyu | 399/376 |
| 2006/0017965 | A1 | * | 1/2006 | Tonegawa | 358/1.15 |
| 2006/0105758 | A1 | * | 5/2006 | Maislos | 455/420 |
| 2006/0279780 | A1 | * | 12/2006 | Anno et al. | 358/1.15 |
| 2007/0030530 | A1 | * | 2/2007 | Inada et al. | 358/474 |
| 2007/0279711 | A1 | * | 12/2007 | King et al. | 358/508 |
| 2007/0285732 | A1 | * | 12/2007 | Itoh | 358/402 |
| 2009/0219568 | A1 | * | 9/2009 | Machida | 358/1.15 |

FOREIGN PATENT DOCUMENTS

CN    2546969    4/2003

OTHER PUBLICATIONS

Chinese Office Action issued Dec. 14, 2010 in CN Application No. 200710127413.6.

* cited by examiner

*Primary Examiner* — Twyler Haskins
*Assistant Examiner* — Nicholas Pachol
(74) *Attorney, Agent, or Firm* — Stanzione & Kim, LLP

(57) ABSTRACT

A scanning apparatus to indicate a scanning progress status includes a main body having a platen on which a document is set, a scanning module to move inside the main body and to scan the document, and an indicating light disposed integrally with the scanning module to indicate a current location of the scanning module.

25 Claims, 5 Drawing Sheets

SCANNING APPARATUS WITH POSITION INDICATOR AND IMAGE FORMING APPARATUS HAVING THE SAME

CROSS-REFERENCE TO RELATED APPLICATIONS

This application claims priority under 35 U.S.C. §119(a) from Korean Patent Application No. 2006-88163 filed Sep. 12, 2006 in the Korean Intellectual Property Office, the disclosure of which is incorporated herein by reference in its entirety.

BACKGROUND OF THE INVENTION

1. Field of the Invention

The present general inventive concept relates to a scanning apparatus. More particularly, the present general inventive concept relates to a flatbed scanning apparatus and an image forming apparatus having the same.

2. Description of the Related Art

Generally, a flatbed scanning apparatus is an apparatus that places a document at a fixed position and forces a scanning module to move and to read the document.

A conventional flatbed scanning apparatus includes a platen where a document is placed, and a scanning module that is movably disposed under the platen and reads the document on the platen.

The scanning module includes a scanning light source to illuminate the document, and a scanning sensor that receives light reflected from the document and converts it to electrical signals. The scanning module uses a charge-coupled device (CCD) or a CMOS image sensor (CIS) as the scanning sensor. The CCD sensor needs great intensity of light enough to read images of the document. Therefore, the scanning module having the CCD sensor uses scanning light sources with great intensity of light. The CIS sensor can read images of the document using small intensity of light, so that the scanning module having the CIS sensor uses the scanning light sources with small intensity of light.

When scanning a document in the flatbed scanning apparatus, a user sets the document on the platen and turns on the flatbed scanning apparatus. Then, the scanning module moves under the platen and reads the document. In other words, when the flatbed scanning apparatus is turned on, the scanning light source emits light toward the document, and then, the scanning sensor receives the light reflected from the document and converts it to electrical signals representing the second document.

When performing a scanning work in a flatbed scanning apparatus, the document on the platen need to be covered by a lid to minimize deterioration of scanned images caused by outside lights. However, when scanning the document covered by the lid, a user cannot see the scanning module moving under the platen. As a result, there is a problem that users cannot know a scanning progress status during the scanning work.

In an attempt to solve the above problem, there has been developed a flatbed scanning apparatus that has a light guiding member that guides light emitted from a scanning light source to an outside of the flatbed scanning apparatus, so that users can perceive a scanning progress status according to light emitting through the light guiding member.

The above-described method allows users to easily perceive a scanning progress status. However, it is required to use a scanning light source with greater intensity of light in order to guide light of the scanning light source to the outside. As a result, the above method can be applied to flatbed scanning apparatuses using CCD sensors, but cannot be applied to flatbed scanning apparatuses using CIS sensors. Accordingly, there is a need for developing methods or apparatuses to allow users to easily perceive a scanning progress status of a scanning apparatus using a scanning light source with small intensity of light.

SUMMARY OF THE INVENTION

The present general inventive concept provides a scanning apparatus, which may use a scanning light source with small intensity of light and allow users to easily perceive a scanning progress status, and an image forming apparatus having the same.

Additional aspects and advantages of the present general inventive concept will be set forth in part in the description which follows and, in part, will be obvious from the description, or may be learned by practice of the general inventive concept.

The above aspect and/or other aspects and feature of the present general inventive concept can substantially be achieved by providing a scanning apparatus, which includes a main body having a platen on which a document is set, a scanning module to move inside the main body and to scan the document, and an indicating light disposed integrally with the scanning module to indicate a current location of the scanning module.

The scanning apparatus may further include an indicating window formed at the main body to allow light emitting from the indicating light to be seen outside when the indicating light is turned on.

The indicating window may include a standby window formed at a position corresponding to the indicating light when the scanning module stands by.

The indicating light may blinks on and off when an error occurs.

The above and/or other aspects and features of the present general inventive concepts may also be achieved by providing a scanning apparatus including a main body having a platen on which a document is set, a scanning module to move inside the main body and to scan the document, and an indicating light having a plurality of lighting sources disposed at the main body in a moving direction of the scanning module to indicate a current location of the scanning module.

One of the lighting sources corresponding to a current location of the scanning module may be turned on in a scanning operation. Alternatively, in the scanning operations all lighting sources corresponding as the scanning module may be turned on in the scanning operations.

The above and/or other aspects and features of the present general inventive concepts may also be achieved by providing an image forming apparatus including a scanning apparatus having a main body with a platen on which a document is set, a scanning module to move inside the main body and to scan the document, and an indicating light disposed integrally with the scanning module to indicate a current location of the scanning module, and a printing unit disposed integrally with the scanning apparatus to form an image corresponding the scanned document on a printing medium.

The indicating light may blink on and off when an error occurs in the printing unit.

The image forming apparatus may further include a facsimile unit disposed integrally with the scanning apparatus to transmit and receive faxes, wherein the indicating light blinks on and off when a call arrives to the facsimile unit.

The above and/or other aspects and features of the present general inventive concepts may also be achieved by providing an image forming apparatus including a scanning apparatus having a main body with a platen on which a document is set, a scanning module to move inside the main body and to scan the document, and an indicating light comprising a plurality of lighting sources disposed at the main body in a moving direction of the scanning module to indicate a current location of the scanning module, and a printing unit disposed integrally with the scanning apparatus to form images on a sheet of printing medium.

The foregoing and/or other aspects of the present general inventive concepts may also be achieved by providing a scanning apparatus usable in an image forming apparatus, the scanning apparatus including a main body, a scanning module disposed to move with respect to the main body to scan a document, a window formed on the main body, and an indicating light unit to indicate a position of the scanning module with respect to the document through the window.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE PREFERRED EMBODIMENTS

Figure 1:
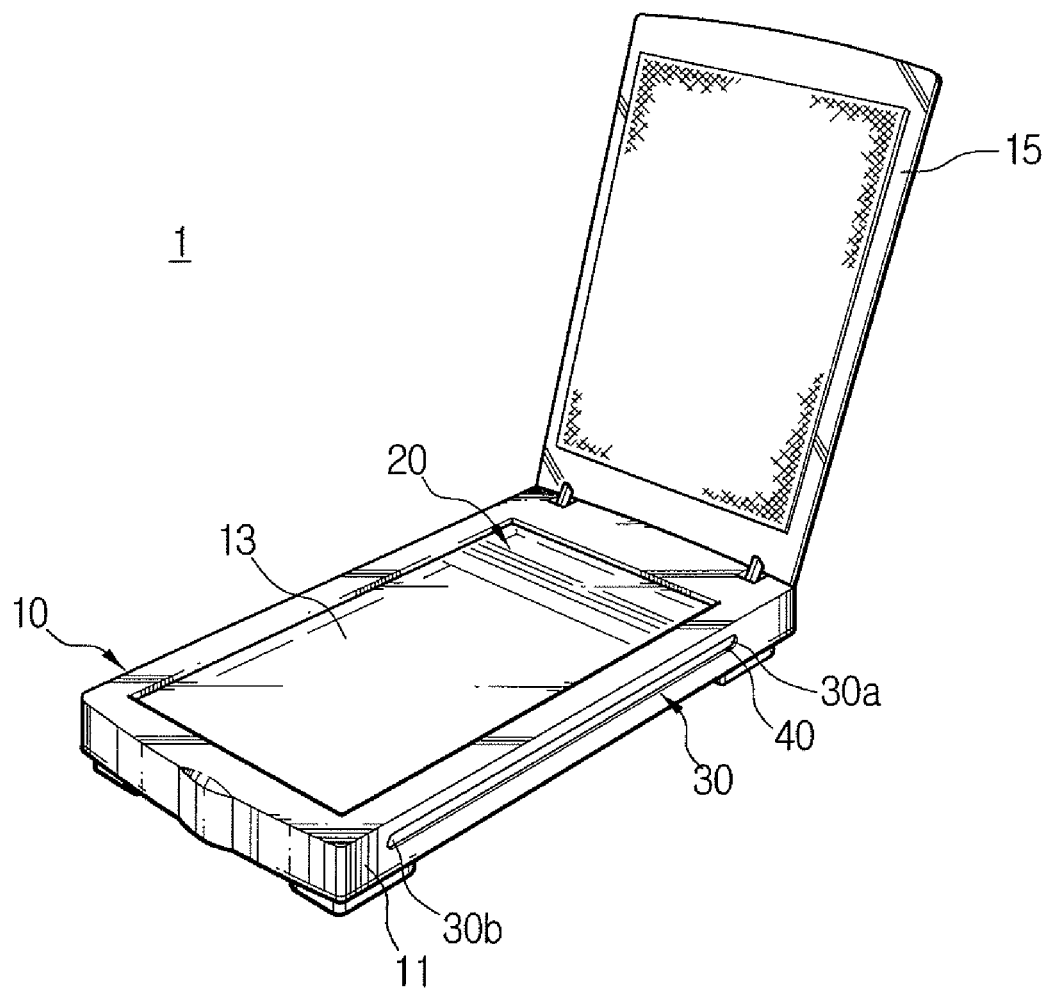
FIG. 1 is a perspective view illustrating a scanning apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Referring to FIG. 1, a scanning apparatus 1 according to an embodiment of the present general inventive concept includes a main body 10, a scanning module 20, and an indicating light 40.

The main body 10 includes a platen 13 on which a document is set, and a moving unit (not shown) disposed inside the main body 10 to cause the scanning module 20 to linearly move with respect to the main body 10.

The platen 13 is made of a transparent glass. The moving unit is the substantially same as that of a conventional scanning apparatus; therefore, a detail description thereof is omitted. A lid 15 is disposed at a side of the platen 13 to selectively open and close the platen 13.

An indicating window 30 is disposed at a front side 11 of the main body 10 in a moving direction of the scanning module 20. The indicating window 30 may have a length equal to or longer than that of a traveling (moving) distance of the scanning module 20. It is possible that the indicating window 30 may have a length shorten then the traveling distance of the scanning module 20 when the indicating light 40 is not fixedly mounted on the scanning module 20. The indicating window 30 is configured in such a way that when an indicating light 40 is turned on, the indicating light 40 can be seen from an outside of the main body 10. The indicating window 30 is made of any of a semi-transparent material or transparent material so that light emitting from the indicating light 40 can be seen from the outside. The indicating window 30 is disposed at a slot formed at the front side 11 of the main body 10 in the moving direction of the scanning module 20. The indicating window 30 has a length corresponding to a moving distance of the scanning module 20. Therefore, during a scanning work (operation or mode), the indicating light 40 moves from an end 30a of the indicating window 30, i.e., a starting end, to the other end 30b of the indicating window 30, i.e., a terminal end.

Figure 3:
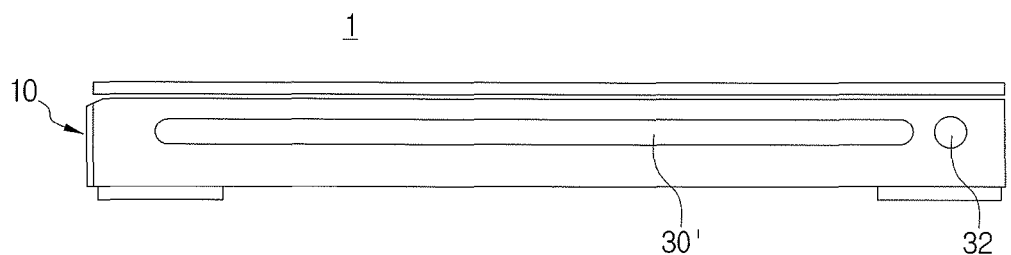
FIG. 3 is a front view illustrating a scanning apparatus having an indicating window according to an embodiment of the present general inventive concept.

On the other hand, the main body 10 may further have a standby window 32 formed at the front side 11 of the main body 10 corresponding to a location where the scanning module 20 stands by in a standby mode before starting to scan in the scanning mode. The standby window 32 may be formed in an independent window separated from the indicating window 30 as illustrated in FIG. 3. In this exemplary embodiment, the standby window 32 is formed in a circle shape. When the indicating light 40 behind the standby window 32 is turned on, the standby window 32 becomes light so that users can easily know that the scanning apparatus 1 is ready to scan. In this case, the indicating window 30 of FIG. 3 may have a length shorter than the moving distance of the scanning module 20 to scan the document.

Figure 2:
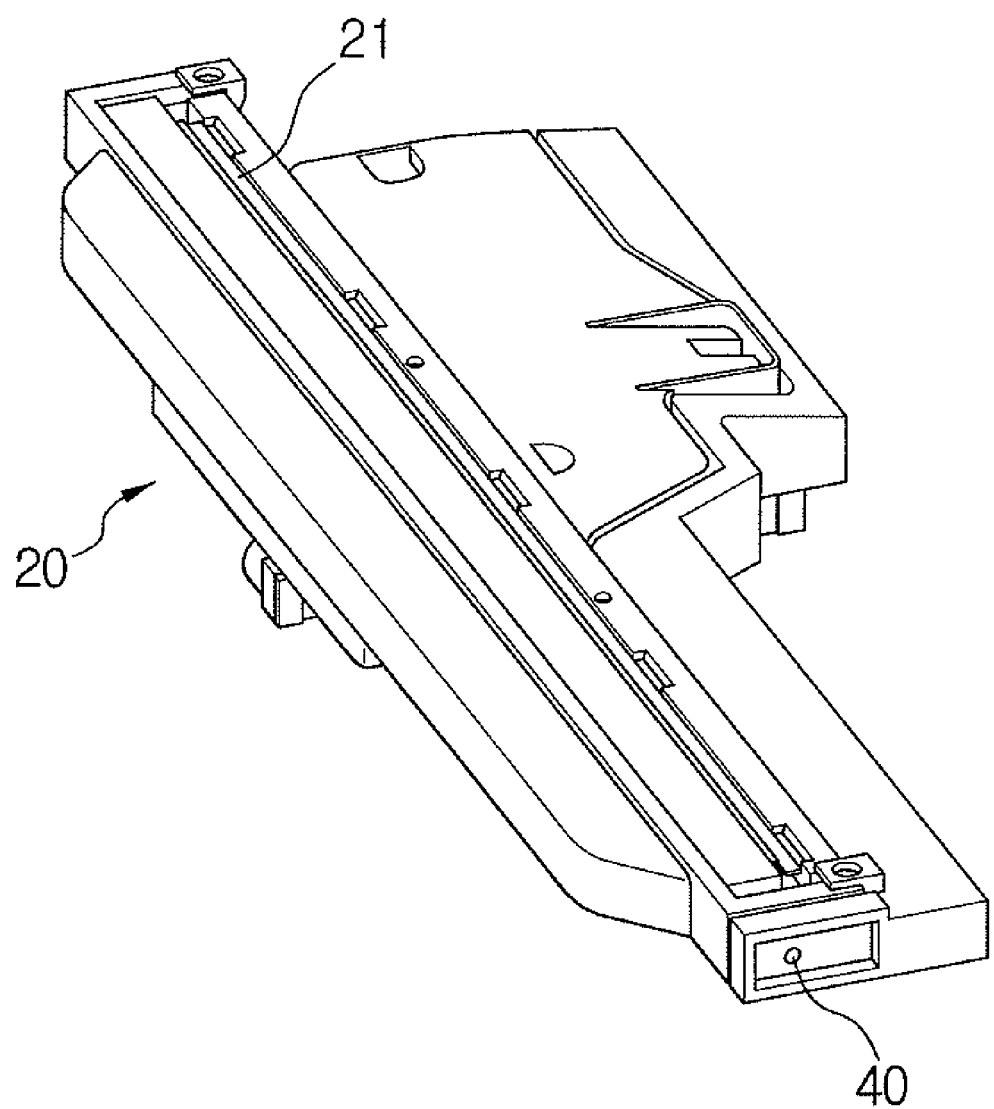
FIG. 2 is a perspective view illustrating a scanning module and an indicating light of the scanning apparatus of FIG. 1.

The scanning module 20 scans a document set on the platen 13 and is disposed under the platen 13 inside the main body 10 to move linearly by the moving unit. Referring to FIG. 2, the scanning module 20 includes a scanning light source 21 to emit light toward the document, and one or more scanning sensors (not shown) that read the document by detecting the light reflected from the document. The CMOS image sensor (CIS) is used as the scanning sensor. The CIS sensors can scan a document in small intensity of light compared to the greater intensity of the light in CCD sensor. Therefore, the scanning module 20 having the CIS sensors uses the scanning light source 21 having smaller intensity of light than that of a scanning module employing CCD sensors.

The indicating light 40 indicates a current location of the scanning module 20 and is disposed at a side of the scanning module 20 to move with the scanning module 20. In this exemplary embodiment, as illustrate in FIG. 2, the indicating light 40 is disposed integrally with the scanning module 20. Therefore, if the scanning module 20 moves, the indicating light 40 moves. The indicating light 40 is disposed at a position where light emitting from the indicating light 40 does not interfere with the scanning module 20 to scan a document. Therefore, the indicating light 40 may be disposed at a lower level than that of a position where the scanning light source 21 is disposed with respect to the platen 13.

Also, although not illustrated, the indicating light 40 may not be disposed integrally with the scanning module 20 but may be linked to the scanning module 20 so as to move as the scanning module 20 moves. At this time, a shield plate 14 may be provided between the indicating light 40 and the scanning module 20 to prevent light emitting from the indicating light 40 from entering the scanning module 20. When the scanning light source is disposed in a direction, the indicating light 40 is disposed to emit light in the direction.

On the other hand, the indicating light 40 is turned on when the scanning apparatus 1 is ready to scan, and is kept to be on during a scanning work. When an error occurs in the scanning module 20, the indicating light 40 may be configured to blink on and off. A light emitting diode (LED) may be used as the indicating light 40 to prevent the scanning apparatus 1 from consuming power and to decrease electrical power consumption. The indicating light 40 may be configured by only one lighting source. Alternatively, the indicating light may be configured by a plurality of lighting sources. When indicating errors, etc., the indicating light 40 including the plurality of lighting sources can give various visual effects. For example, one of the lighting sources can be used as the indicating light 40, and another one of the lighting sources can be used to indicate the error of the scanning apparatus 1.

Hereinafter, an operation of a scanning apparatus 1 according to the embodiment of the present general inventive concept will be explained with reference to FIGS. 1 and 2.

When the scanning apparatus 1 is supplied with an electrical power to become ready to scan, the scanning module 20 is located at a starting position and the indicating light 40 is turned on. When the indicating light 40 is turned on, the starting end 30a of the indicating window 30 lightens. In the scanning apparatus 1 having the standby window 32 as illustrated in FIG. 3, when the scanning apparatus 1 becomes ready to scan, the indicating light 40 is turned on behind the standby window 32 so that the standby window 32 lightens.

When a user opens the lid 15 and sets a document on the platen 13 and starts to scan, the scanning module 20 moves to scan and read the document. At this time, the indicating light 40 disposed at a side of the scanning module 20 moves with the scanning module 20. Therefore, when the scanning module 20 is moving, a user can watch for the indicating light 40 to be moving through the indicating window 30. In other words, at the beginning of a scanning work, the indicating light 40 locates at the starting end 30a of the indicating window 30, and moves toward the terminal end 30b of the indicating window 30 according as the scanning work goes forward.

When the scanning work completes, the indicating light 40 locates at the terminal end 30b of the indicating window 30. Therefore, according to a location of the indicating light 40 through the indicating window 30, a status at a scanning work can be recognized.

Also, when the scanning apparatus 1 is supplied with an electrical power but cannot perform a scanning work due to an error, the indicating light 40 blinks on and off. Therefore, according to the indicating light 40 to blink on and off through the indicating window 30, an error occurring in the scanning apparatus 1 can be recognized.

Figure 4:
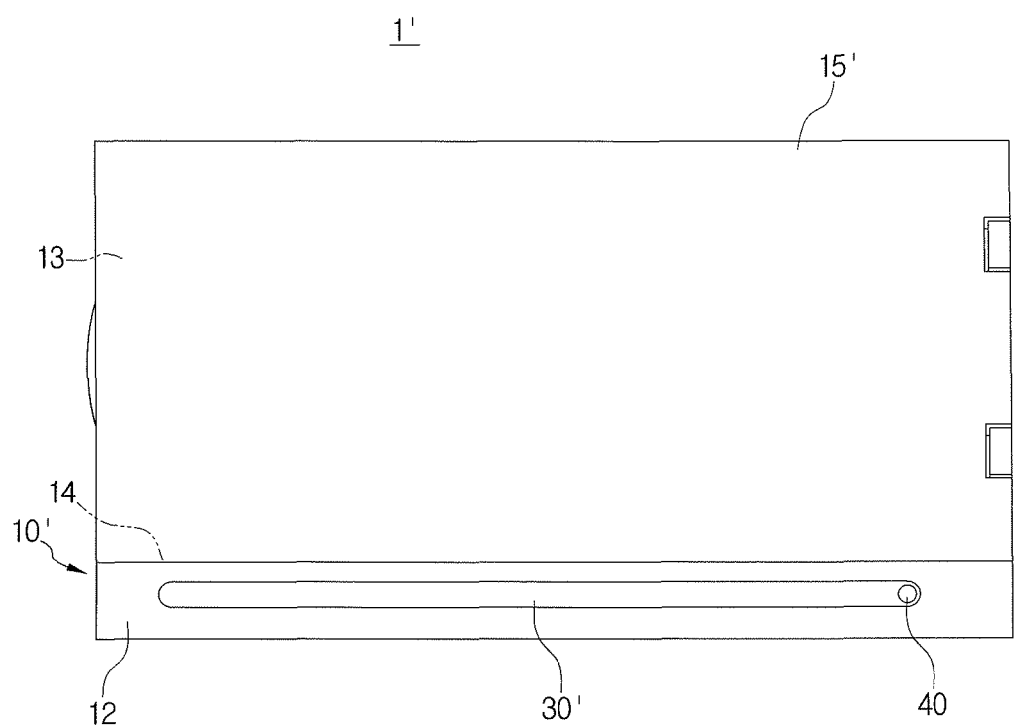
FIG. 4 is a perspective view illustrating a scanning apparatus according to an embodiment of the present general inventive concept.

FIG. 4 is a plan view illustrating a scanning apparatus according to an embodiment of the present general inventive concept.

A scanning apparatus 1' according to the present embodiment is different from the scanning apparatus 1 of FIG. 1. An indicating window 30' that is disposed at a side of a top surface 12 of a main body 10', that is, at a side of a platen 13 (see FIGS. 1 and 4) of a top surface 12 of the main body 10'. At this time, the indicating window 30' is disposed in a moving direction of the scanning module 20 (see FIG. 1) and has a length corresponding to a moving distance of the scanning module 20 and is not covered by a lid 15'. In FIG. 4, the lid 15' is placed on the platen 13 to cover the document.

On the other hand, in the present embodiment, because the indicating light 40 emits light upward the same as the scanning light source, it is required to prevent the light of the indicating light 40 from interfering with a scanning work. Therefore, the shield plate 14 may be disposed between the indicating light 40 and the scanning module 20 inside the main body 10' so as to prevent the light of the indicating light 40 from going toward the scanning module 20.

The scanning module 20, the indicating light 40, the lid 15' and an operation of the scanning apparatus 1' according to the present embodiment maybe the substantially same as those of the scanning apparatus 1 of FIG. 1; therefore, detailed explanations thereof are omitted.

Figure 5:
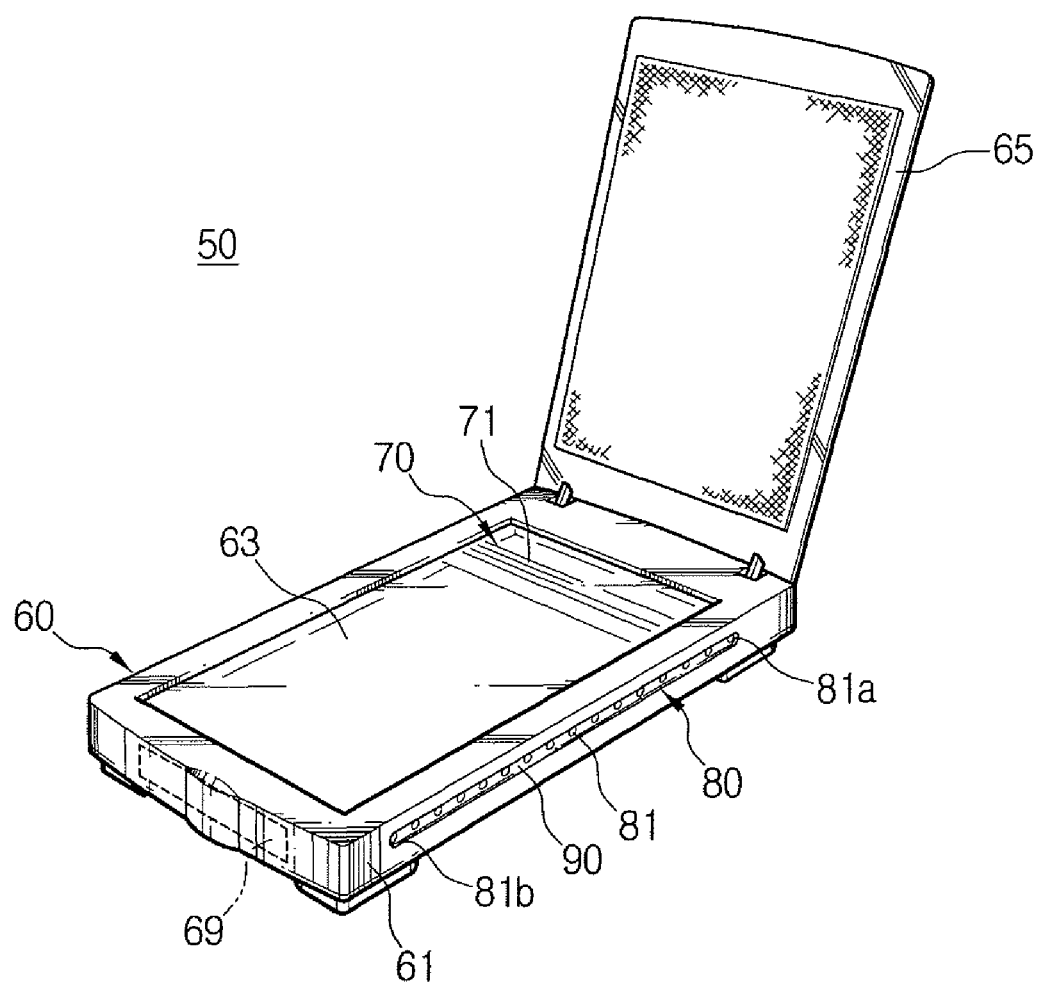
FIG. 5 is a perspective view illustrating a scanning apparatus according to an embodiment of the present general inventive concept.

FIG. 5 is a perspective view illustrating a scanning apparatus 50 according to an embodiment of the present general inventive concept.

Referring to FIG. 5, the scanning apparatus 50 includes a main body 60, a scanning module 70, and an indicating light 80.

The main body 60 includes a platen 63 on which a document is put and a moving unit (not shown) that is disposed inside the main body 60 and causes the scanning module 70 to linearly move. The main body 60 is substantially similar to the main body 10 of the scanning apparatus 1 of FIG. 1; therefore, a detailed explanation is omitted.

The scanning module 70 includes a scanning light source 71 to scan a document being set on the platen 63 and is disposed under the platen 63 inside the main body 60 to move linearly by the moving unit. The scanning module 70 is the substantially same as the scanning module 20 of the scanning apparatus 1 of FIG. 1; therefore, a detailed explanation thereof is omitted.

The indicating light 80 includes a plurality of lighting sources 81. The plurality of lighting sources 81 is disposed in a line at a front side 61 of the main body 60 in a moving direction of the scanning module 70. In the present embodiment, sixteen LEDs 81 are disposed in a line at the front side 61 of the main body 60.

A controller 69 includes a memory to store a position of each of the plurality of lighting sources 81 disposed in a moving direction of the scanning module 70. Also, the controller 69 can determine a current location of the scanning module 70 during a scanning work (scanning mode or operation). Therefore, when the scanning module 70 stands by to scan, the controller 69 turns on a lighting source 81a at a starting end and causes the other lighting sources 81 to keep off. Also, when the scanning module 70 moves, the controller 69 turns on a lighting source 81 corresponding to a location where the scanning module 70 passes by. At this time, the controller 69 may be configured to turn on a new lighting source 81 and turn off a previously turned-on lighting source 81 that the scanning module 70 already passed by. Alternatively, the controller 69 may be configured to turn on a new lighting source 81 and cause the previously turned-on lighting sources 81 that the scanning module 70 already passed by to keep on.

Also, an indicating window 90 may be disposed above the indicating light 80 at the front side 61 of the main body 60 to protect the indicating light 80. The indicating window 90 may be made of any of transparent or semitransparent materials.

Hereinafter, an operation of the scanning apparatus 50 according to the embodiment of the present general inventive concept will be explained with reference to FIG. 5.

When the scanning apparatus 50 is supplied with an electrical power to become ready to scan, the scanning module 70 is located at a starting position and the indicating light 80 is turned on. In other words, the lighting source 81*a* at the starting end among the plurality of lighting sources 81 forming the indicating light 80 is turned on. The lighting source 91*a* at the starting end turned on informs users that the scanning apparatus 50 becomes ready to perform a scanning work.

A user opens a lid 65 and sets a document on the platen 63 and starts to scan. Then scanning module 70 moves in a direction to read the document. At this time, the controller 69 perceives a current location of the scanning module 70 and determines whether there is a lighting source 81 corresponding to the current location of the scanning module 70. If there is a lighting source 81 disposed where the scanning module 70 is passing by now, the controller 69 turns the lighting source 81 on. Then, the user watches that the lighting sources 81 are turned on, and then knows a progress status of a scanning work. In other words, at the beginning of a scanning work a lighting source 81*a* at the starting end of the indicating light 80 is turned on, and then, each of the plurality of lighting sources 81 beside of it is turned on in order according as the scanning work proceeds.

When the scanning work is completed, the plurality of lighting sources 81 of the indicating light 80 is all turned on. Therefore, the user only watches the plurality of lighting sources 81 of the indicating light 80 to be turned on so as to easily know the progress status of the scanning work.

On the other hand, when the controller 69 turns on only a lighting source 81 corresponding to where the scanning module 70 is passing by and turns off the other lighting sources 81, a light looks to move from a starting end of the indicating light 80 to a terminal end thereof. At this time, the user watches where a turned on lighting source is so as to know the progress status of a scanning work.

Also, when an electrical power is supplied to the scanning apparatus 50 and an error occurs for the scanning apparatus 50 not to perform a scanning work, the plurality of lighting sources 81 of the indicating light 80 blinks on and off. Therefore, the indicating light 80 to blink on and off allows users to easily know that an error occurs in the scanning apparatus 50.

Figure 6:
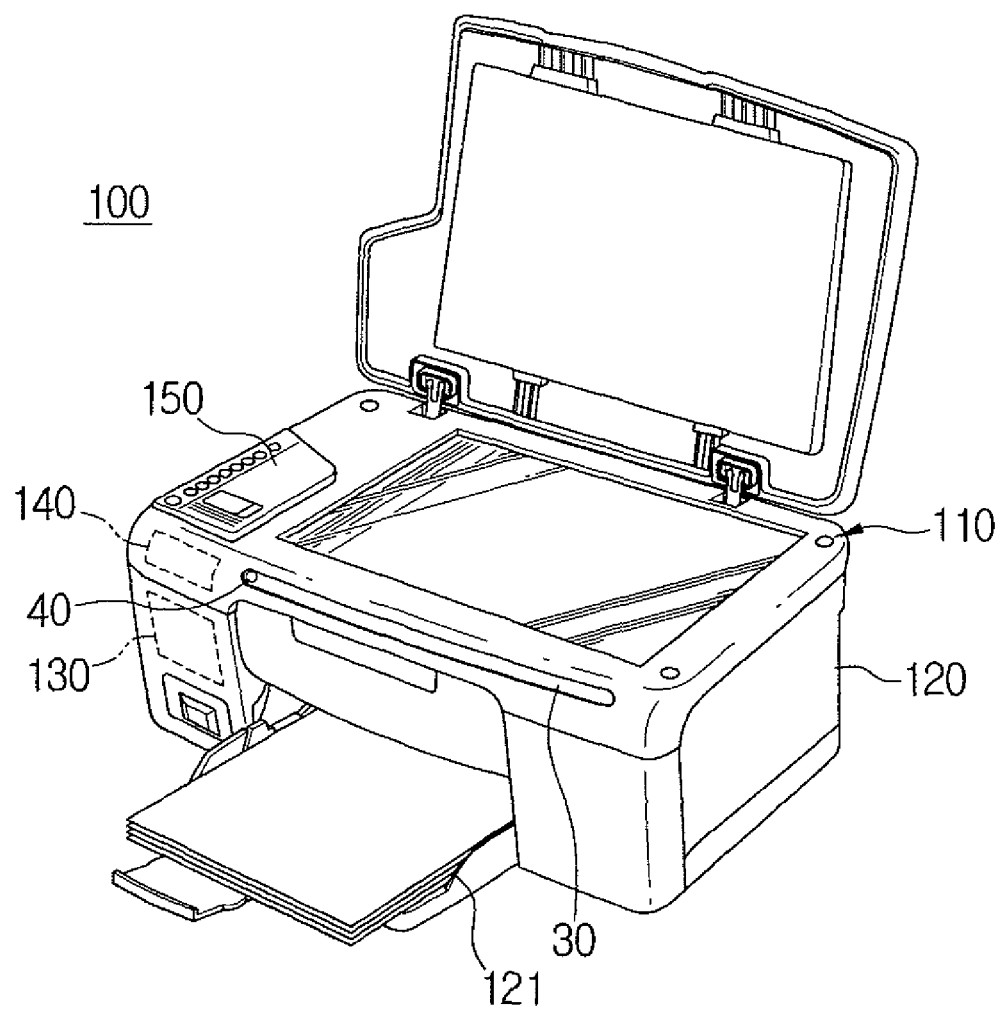
FIG. 6 is a perspective view illustrating an image forming apparatus having a scanning apparatus according to an embodiment of the present general inventive concept.

FIG. 6 is a perspective view illustrating an image forming apparatus 100 having a scanning apparatus 110 according to an embodiment of the present invention.

Referring to FIG. 6, the image forming apparatus 100 according to the present embodiment is a composite apparatus that can perform a scanning work, a copying work, a printing work, and a facsimile work by one apparatus. The image forming apparatus 100 includes the scanning apparatus 110, a printing unit 120, a facsimile unit 130, and a controller 140.

The scanning apparatus 110 is substantially similar to the scanning apparatus 1 of FIG. 1; therefore, a detailed description thereof is omitted. However, at a side of the scanning apparatus 110 is disposed a control panel 150 that controls the image forming apparatus 100 to perform a scanning work, a copying work, a printing work, and a facsimile work.

The printing unit 120 is integrally disposed under the scanning apparatus 110, and prints printing data that the scanning apparatus 110 scanned documents, printing data transmitted from a computer (not shown) connected with the image forming apparatus 100 and a received fax on sheets of printing media.

The printing unit 120 includes a printing medium feeding unit 121 to feed a sheet of printing medium, an image forming unit (not shown) to form images on a sheet of printing medium, and a discharging unit (not shown) to discharge a sheet of printing medium having printed. The printing medium feeding unit 121, the image forming unit, and the discharging unit constituting the printing unit 120 are substantially similar to a conventional printing unit; therefore, detailed descriptions thereof are omitted.

The facsimile unit 130 is disposed inside the image forming apparatus 100, and transmits faxes to other facsimiles and receives faxes from other facsimiles via a telephone network. Received faxes are printed on sheets of printing media by the printing unit 120 described above. The facsimile unit 130 is substantially similar to a conventional facsimile unit; therefore, a detailed description is omitted.

The controller 140 controls the scanning apparatus 110, the printing unit 120, and the facsimile unit 130 described above according to signals inputted by the control panel 150 so that the image forming apparatus 100 performs a scanning work, a copying work, a printing work, and a facsimile work.

Furthermore, the controller 140 monitors the scanning apparatus 110, the printing unit 120, and the facsimile unit 130 so that when errors occur, it lets users know an error occurrence using an indicating light 40 of the scanning apparatus 110. In other words, when an error occurs in the image forming apparatus 100, the controller 140 blinks on and off the indicating light 40 of the scanning apparatus 110 so that users see the indicating light 40 to blink on and off through an indicating window 30, thereby knowing for errors to occur.

When there are various kinds of errors in the image forming apparatus 100, an interval of blink of the indicating light 40 is set in various ways to express various kind errors. For example, when a sheet of printing medium is jammed in the printing unit 120, the indicating light 40 is blinked on and off at short intervals, and when there is no printing medium in the printing unit 120, the indicating light 40 is blinked on and off at long intervals.

Also, the indicating light 40 is used as a receive call indicating signal that indicates the arrival of a call to the facsimile unit 130. At this time, when a call is arrived to the facsimile unit 130, the controller 140 forces the indicating light 40 to blink on and off at very short intervals. As a result, users can perceive a call to the facsimile unit 130.

Introductions that the controller 140 controls the indicating light 40 to indicate error occurring, receiving a call, etc are previously stored in a storage device (not shown) of the controller 140 such as a read only memory (ROM).

In above descriptions, the composite apparatus is used as an image forming apparatus including a scanning apparatus 1 according to the embodiment of the present general inventive concept; however, this should not be considered as limiting. A scanning apparatus according to an exemplary embodiment of the present invention may be applied to copiers, facsimile machines, etc with a flatbed scanning apparatus.

Also, the above descriptions are with respect to a scanning apparatus using CIS sensors that require small intensity of light; however, these should not be considered as limiting. Alternatively, the present invention may be applied to scanning apparatuses using CCD sensors.

As described above, with a scanning apparatus and a composite apparatus having the same according to an exemplary embodiment of the present invention, a separate indicating light indicates a current location of a scanning module so that the present invention can be applied in flatbed scanning apparatuses using lighting sources with small intensity of light to allow users to easily know a progress status of a scanning work.

Also, with a scanning apparatus and a composite apparatus having the same according to an exemplary embodiment according of the present invention, when errors occur, an indicating light is blinked on and off. As a result, user can easily know error to occur.

Furthermore, composite apparatuses using a scanning apparatus according to an exemplary embodiment of the present invention may indicate the arrival of a call by an indicating light and may not use a telephone ring. As a result, it can indicate the arrival of faxes without noise.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A scanning apparatus comprising:
   a main body comprising a platen on which a document is set;
   a scanning module to move inside the main body and to scan the document with a scanning light source disposed on a first side of the main body; and
   an indicating light source separate from the scanning light source disposed integrally with the scanning module at a second side different from the first side to emit light at the second side and outside the main body to indicate a current location of the scanning module.

2. The scanning apparatus according to claim 1, further comprising:
   an indicating window formed at the main body to allow light emitted from the indicating light source to be exposed outside when the indicating light source is turned on.

3. The scanning apparatus according to claim 2, wherein the indicating window further comprises a standby window formed at a position corresponding to the indicating light source when the scanning module stands by.

4. The scanning apparatus according to claim 1, wherein the indicating light source blinks on and off when an error occurs.

5. The scanning apparatus according to claim 1, wherein the indicating light source is an LED.

6. A scanning apparatus comprising:
   a main body comprising a platen on which a document is set;
   a scanning module to move inside the main body and to scan the document with a scanning light source disposed on a first side of the main body; and
   an indicating light source separate from the scanning light source disposed integrally with the main body at a second side different from the first side to emit light at the second side and outside the main body, the indicating light source comprising a plurality of lighting sources located on the second side in a moving direction of the scanning module to indicate a current location of the scanning module.

7. The scanning apparatus according to claim 6, wherein one of the lighting sources is turned on to correspond to a current location of the scanning module in a scanning operation.

8. The scanning apparatus according to claim 6, wherein the lighting sources are turned on when the scanning module passes by in a scanning operation.

9. The scanning apparatus according to claim 6, wherein the indicating light source blinks on and off when an error occurs.

10. An image forming apparatus comprising:
    a scanning apparatus comprising:
       a main body comprising a platen on which a document is set,
       a scanning module to move inside the main body and to scan the document with a scanning light source disposed on a first side of the main body, and
       an indicating light source separate from the scanning light source and disposed integrally with the scanning module at a second side of the main body different from the first side to emit light from the second side and outside the main body to indicate a current location of the scanning module; and
    a printing unit disposed with the scanning apparatus to form images on a sheet of printing medium.

11. The image forming apparatus according to claim 10, wherein the indicating light source blinks on and off when an error occurs in the printing unit.

12. The image forming apparatus according to claim 10, further comprising:
    a facsimile unit disposed integrally with the scanning apparatus to transmit and receive faxes,
    wherein the indicating light source blinks on and off when a call arrives to the facsimile unit.

13. An image forming apparatus comprising:
    a scanning apparatus comprising;
    a main body comprising a platen on which a document is set;
    a scanning module to move inside the main body and to scan the document with a scanning light source disposed on a first side of the main body; and
    an indicating light source separate from the scanning light source disposed integrally with the scanning module at a second side of the main body different from the first side to emit light from the second side and outside the main body, the indicating light source comprising a plurality of lighting sources located on the second side of the main body in a moving direction of the scanning module to indicate a current location of the scanning module; and
    a printing unit disposed with the scanning apparatus to form images on a sheet of printing medium.

14. The image forming apparatus according to claim 13, wherein the indicating light source blinks on and off when an error occurs in the printing unit.

15. The image forming apparatus according to claim 13, further comprising:
    a facsimile unit disposed integrally with the scanning apparatus to transmit and receive faxes,
    wherein the indicating light source blinks on and off when a call arrives to the facsimile unit.

16. A scanning apparatus comprising:
    a main body;
    a scanning module disposed to move with respect to the main body to scan a document with a scanning light source disposed on a first side of the main body;
    a window formed on the main body; and
    an indicating light unit including an indicating light source different from the scanning light source and disposed integrally with the scanning module at a second side of the main body different from the first side, the indicating light unit to emit light from the second side of the main body and outside the main body to indicate a position of the scanning module with respect to the document through the window.

17. The scanning apparatus according to claim 16, wherein the window is formed in the same direction as a moving direction of the scanning module.

18. The scanning apparatus according to claim 16, wherein the main body comprises a platen on which the document is disposed, and the window is formed on the same side of the main body on which the platen is disposed.

19. The scanning apparatus according to claim 16, wherein the main body comprises a first side on which the document is disposed, and a second side on which the window is disposed.

20. The scanning apparatus according to claim 16, wherein the scanning module is disposed in a first direction, and the window is disposed in a second direction.

21. The scanning apparatus according to claim 16, wherein the window has a length to correspond to a moving distance of the scanning module.

22. The scanning apparatus according to claim 16, wherein the indicating light unit comprises a plurality of lighting sources to be turned on according to the location of the scanning module.

23. The scanning apparatus according to claim 16, wherein the window is disposed in a lengthwise direction of the document, and the scanning module and the indicating light unit move along the lengthwise direction.

24. The scanning apparatus according to claim 16, wherein the scanning module generates a first light to scan the document, and the indicating light unit generates a second light in a different direction from the first light according to a relationship between the document and the scanning module.

25. The scanning apparatus according to claim 16, wherein the window comprises a single window that is aligned with the indicating light source and that extends along a scanning direction of the main body.

* * * * *